(12) United States Patent
Westman et al.

(10) Patent No.: US 9,515,997 B1
(45) Date of Patent: Dec. 6, 2016

(54) INLINE DATA ENCRYPTION

(71) Applicant: Amazon Technologies, Inc., Reno, NV (US)

(72) Inventors: Michael Westman, Omaha, NE (US); Jeffrey Harry Widom, Leesburg, VA (US); Josha Wind Stella, Shepherdstown, WV (US)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 13/946,963

(22) Filed: Jul. 19, 2013

(51) Int. Cl.
*H04L 29/06* (2006.01)
*H04L 9/30* (2006.01)

(52) U.S. Cl.
CPC ............ *H04L 63/0428* (2013.01); *H04L 9/30* (2013.01); *H04L 63/0442* (2013.01)

(58) Field of Classification Search
CPC ..... H04L 63/0428; H04L 63/0442; H04L 9/30
USPC ......................................................... 713/153
See application file for complete search history.

(56) References Cited

U.S. PATENT DOCUMENTS

| | | | | |
|---|---|---|---|---|
| 6,263,437 B1* | 7/2001 | Liao | ...................... | H04L 9/0841 380/283 |
| 2004/0054914 A1* | 3/2004 | Sullivan | ................ | G06F 21/602 713/189 |
| 2009/0193264 A1* | 7/2009 | Fedronic | ................ | G06F 21/31 713/184 |
| 2012/0260100 A1* | 10/2012 | Applegate | ............... | G06F 21/34 713/182 |

OTHER PUBLICATIONS

Information Assurance Specialists, Inc., "Cryptographic Ignition Keys: Implementation Methodology and Guidance," Whitepaper published 2011, 13 pages.
ViaSat, Inc., "KG-200 Inline Media Encryptor for Desktops Data Sheet," 2013, obtained online at http://www.viasat.com/files/assets/web/datasheets/KG-200_IME_datasheet_020.pdf on Jul. 19, 2013, 2 pages.
ViaSat, Inc., "KG-200R Ruggedized Hardware Encryptor Data Sheet," 2013, obtained online at http://www.viasat.com/files/assets/web/datasheets/KG-200R_datasheet_019_web.pdf on Jul. 19, 2013, 2 pages.

* cited by examiner

*Primary Examiner* — Hadi Armouche
*Assistant Examiner* — Angela Holmes
(74) *Attorney, Agent, or Firm* — Davis Wright Tremaine LLP

(57) ABSTRACT

Organizations maintain and generate large amount of sensitive information that needs to be saved electronically and there is a need to store that data remotely with a data storage service provider. To prevent unauthorized access to the information stored by organizations on storage provided by the service provider special cryptographic devices, such as an Inline Data Encryptor, can be used to ensure that the information remains secret. The Inline Data Encryptor uses a fill device with secret cryptographic information to encrypt data.

24 Claims, 11 Drawing Sheets

INLINE DATA ENCRYPTION

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

BRIEF DESCRIPTION OF THE DRAWINGS

Various embodiments in accordance with the present disclosure will be described with reference to the drawings, in which.

DETAILED DESCRIPTION

Figure 1:
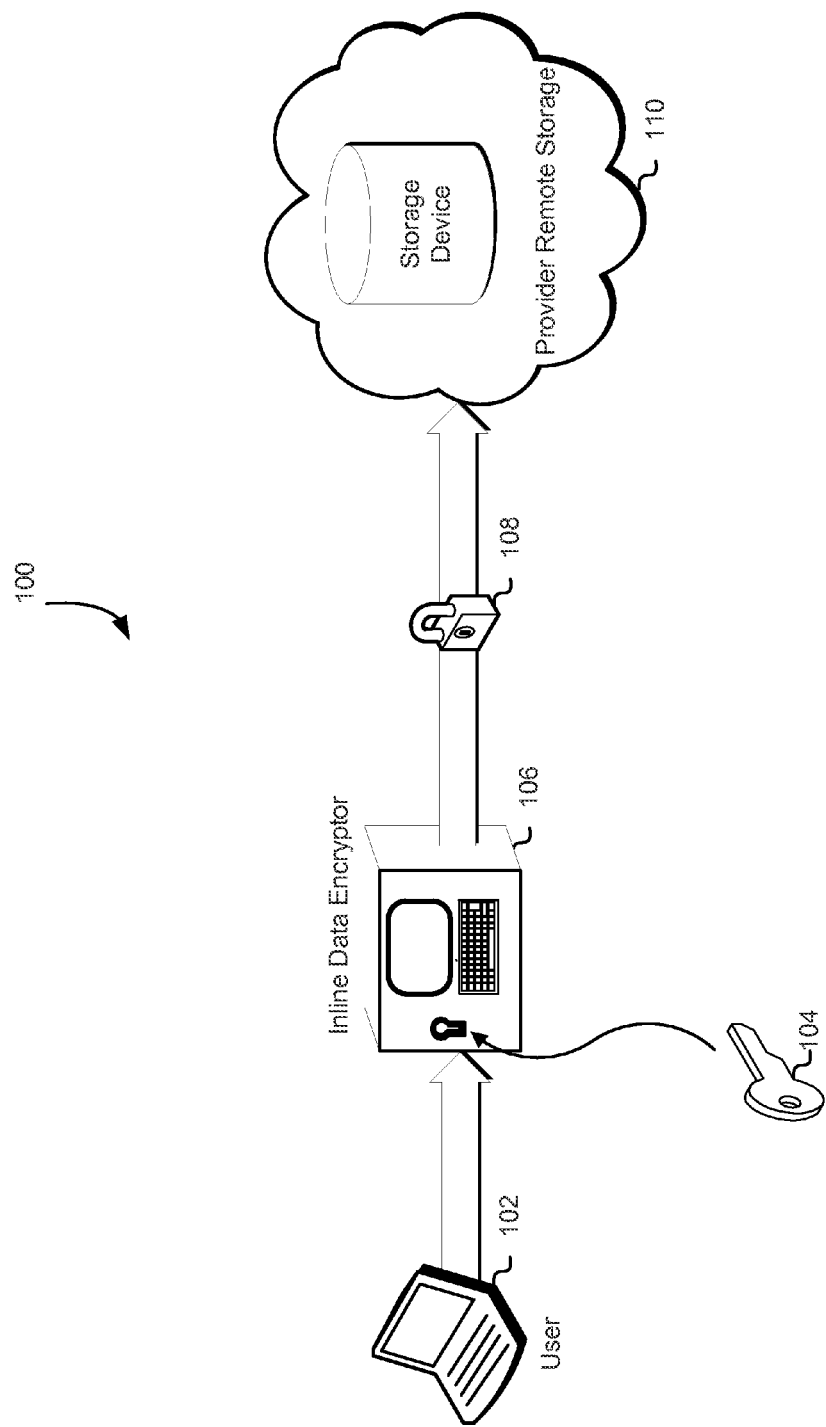
FIG. 1 shows an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for data security in a manner that reduces risks associated with data transmission and/or storage. In various embodiments, a device used for encrypting data, such as an Inline Data Encryptor (IDE), that is capable of connecting to a user device (e.g., laptop computer, smart phone, or tablet) encrypts data transmitted from the user device before the data is received by a data storage service provider (hereinafter service provider) for storage with the service provider. In an embodiment, a connection is established between the user device and the Inline Data Encryptor, the then user selects data via the user device and an operation to be performed on the data, such as backup or restore operations. The data is to be store on or retrieved from a service provider. The user may provide credentials to be authenticated with a service provider before the operation is allowed on the service provider's equipment. Once the user has selected data and an operation, the data is transferred from the user device to the Inline Data Encryptor.

The Inline Data Encryptor then attempts to detect a fill device, which, in an embodiment, is a physical key, and a connection to the user device. In various Embodiments, detection by the Inline Data Encryptor of a physical key causes further operation by the Inline Data Encryptor. The physical key may be inserted directly into the Inline Data Encryptor or within a predetermined proximity to the Inline Data Encryptor. Furthermore, the physical key can be a Crypto Ignition Key (CIK) or any other device capable of loading cryptographic keys into an encryption device. While physical objects (e.g., keys) are used throughout for the purpose of illustration, the scope of the present disclosure includes any devices, which may be referred to as fill devices, from which cryptographic information can be provided to the Inline Data Encryptor, whether via a direct physical connection, a wireless connection, or over a network (e.g., over a secure intranet). Generally, a fill device may be any device configured to load cryptographic information (e.g., cryptographic keys) into an inline data encryptor. Fill devices may operate in accordance with various key fill protocols, such as DS-101 and DS-102.

The Inline Data Encryptor then receives credentials for use with the service provider, such as a private key used to sign data. The Inline Data Encryptor further obtains cryptographic keying information from the CIK or a similar physical key, and uses the keying information to perform an operation on the data selected by the user. For example, the user may select data to be copied from the user device to the service provider's remote storage, the data is transferred to the Inline Data Encryptor and the keying information obtained from the physical key is used to encrypt the data. Once the Inline Data Encryptor encrypts the data it is signed with the user's private key and the data along with the signature is uploaded to the service provider for storage. If the upload fails an error message may be returned to the user. The data on the user device may be classified data when transmitted to the Inline Data Encryptor, the data may then be unclassified once it is transmitted from the Inline Data Encryptor because the data may not be decipherable by others outside of user or the user's organization In various embodiments the Inline Data Encryptor may be located on the same network or virtual network as the user and operate as a proxy between the user and the service provider. For instance, in an embodiment, the Inline Data Encryptor is located in a data center on site. When the user wishes to store data remotely with the service provider, the user then selects data to store, is prompted for login information related to the service provider, the data and the login information are then transmitted to the Inline Data Encryptor, which then encrypts the data and sends the now encrypted data and login information to the service provider for authentication and storage. Alternately the Inline Data Encryptor may be physically connected to the user device. For instance, in an embodiment, the user connects the Inline Data Encryptor physically to the device by Universal Serial Bus (USB) or external Serial Attachment (eSATA). Once connected the user selects files to be stored by the service provider and that data is transferred to the Inline Data Encryptor over the physical connection established by the user. The Inline Data Encryptor may also have a user interface for interacting with the user. The interface may include a mechanism for accepting credentials from the user such as a username and password or the interface maybe capable of collecting biometric data such as a thumb print or retinal scan.

In various embodiments, the Inline Data Encryptor may also be used to retrieve and decrypt information stored with the service provider. For instance, in an embodiment, the user selects data to retrieve from the service provider. The service provider transmits the data to the Inline Data Encryptor, which then decrypts the data with one or more cryptographic keys and transmits decrypted the data through a network connection to the user device. The Inline Data Encryptor may also include all the software required to allow the users to select the data, select an operation, and transfer the data to the Inline Data Encryptor. This software may be automatically downloaded and installed on the user device once a connection is established between the Inline Data Encryptor and the user device. In various embodiments, a web browser running on the user device may make API calls to the Inline Data Encryptor. The Inline data encryptor may, in various embodiment, contain executable code that when executed emulates the service providers API.

In various embodiments the physical key or CIK may include a plastic housing and contain Electrically Erasable Programmable Read-Only Memory (EEPROM) or other form of memory. The memory may be used to store cryptographic information, such as encryption keys. The memory may also store multiple keys for use in key rotation schema. The physical key may have notches or grooves that, when inserted into a lock and turned, operates the lock's mechanism. The notches or grooves in the physical key may also encode information used by the Inline Data Encryptor. In various embodiments, the physical key may be an object various sizes and shapes suitable for use in an environment such as depicted in FIG. 1.

FIG. 1 is an illustrative example of an environment 100 in which various embodiments can be practiced. In the environment 100, a user operates a user device 102 to perform various operations and interact with a service provider 110. The user may be a member of an organization that uses a variety of services provided by the service provider 110 in order to maintain and deliver information, which may be located in various geographic locations. Furthermore the information may travel across unsecured networks such as the Internet. To protect the information in transit and at rest the user and/or organization may use the Inline Data Encryptor 106, to encrypt the information. The Inline Data Encryptor 106 requires a physical key 104 in order to operate and may obtain keying information from the physical key. In various embodiments, the Inline Data Encryptor 106 may include a Trusted Platform Module (TPM) or similar device to maintaining and processing cryptographic information, such as cryptographic keys.

The Inline Data Encryptor 106 may use a stream cipher (e.g., RC4, HC-256, A5/1, Rabbit, or other suitable encryption algorithm) to encrypt data as it is transmitted to the service provider. In various embodiments, the Inline Data Encryptor may, additionally or alternatively, use a block cipher (e.g., RC5, Advanced Encryption Standard (AES), Blowfish, or other suitable encryption algorithm) to encrypt the information. Once encrypted by the Inline Data Encryptor 106 the information may be passed as cipher text 108 to the service provider 110.

Accordingly, as illustrated in FIG. 1, the environment 100 includes a service provider 110 for providing services to the user through the user device 102. The computing resource service provider 110 may be an organization that hosts various computing resources on behalf of one or more customers. For example, a computing resource service provider may operate one or more facilities that are used to host various computing hardware resources, such as hardware servers, data storage devices, network devices, and other equipment, such as server racks, networking cables and the like. The computing resource hardware may utilize its computing hardware resources to operate one or more services. Such services may include services that enable customers of the computing resource service provider to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

Figure 2:
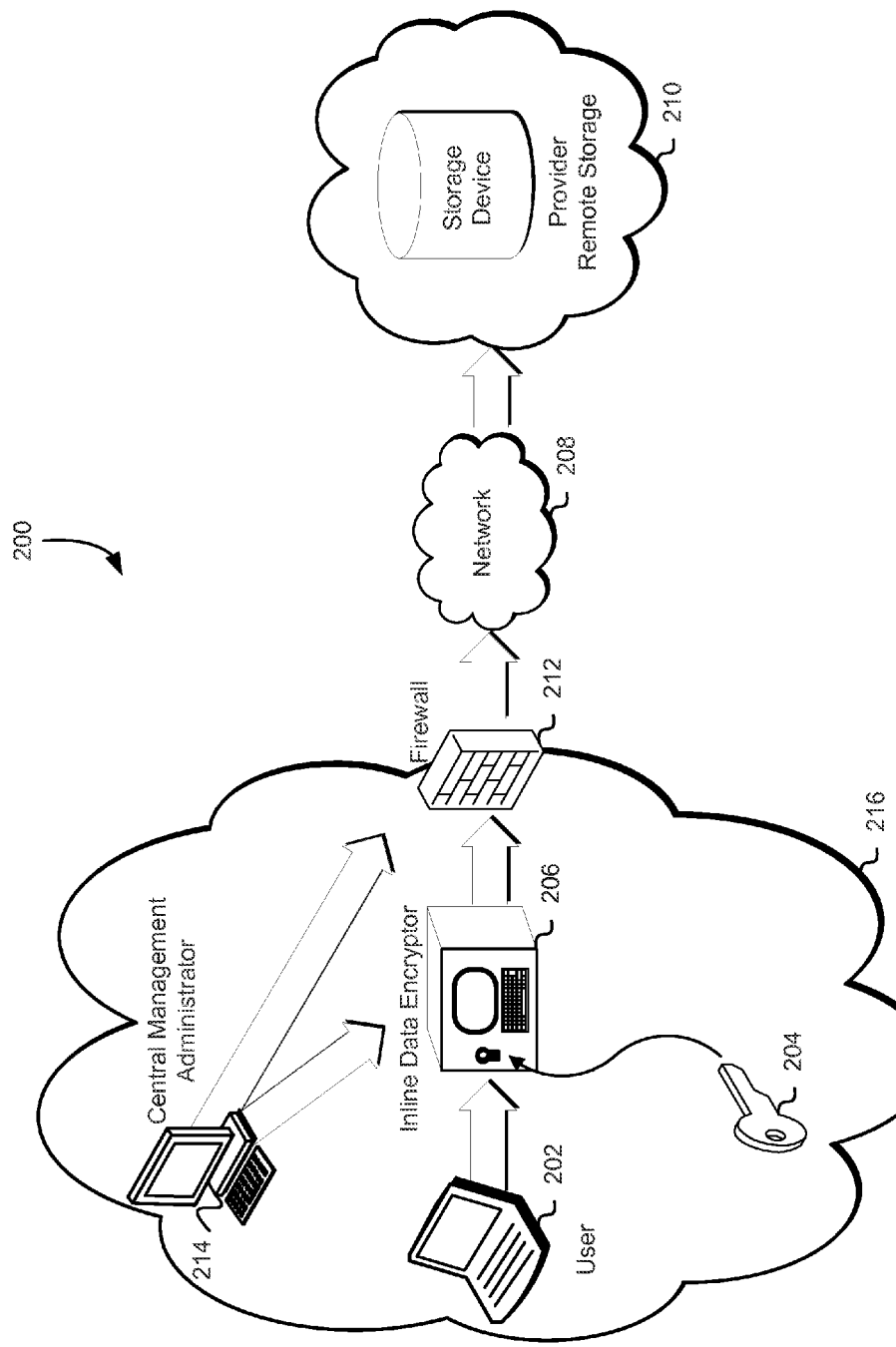
FIG. 2 shows an illustrative example of an environment in which various embodiments can be practiced.

FIG. 2 is an illustrative example of an environment 200 in which various embodiments can be practiced. In environment 200, an organization may operate a data center 216, the organization may also be a customer of the service provider 210. As part of the data center, the organization, may include a firewall 212, in order to prevent unauthorized network traffic. For example, in some embodiments, the firewall may be configured such that inbound traffic from a device on the network is restricted but may be configured to allow outbound traffic from the Inline Data Encryptor. In various embodiments, the data center may also an Inline Data Encryptor 206, in order to protect sensitive and/or confidential information. As described above, the Inline Data Encryptor 206 requires a physical key 204 to encrypt and/or decrypt information received by the Inline Data Encryptor. The service provider 210 may maintain an account for a central management administrator 214 with the ability to create, add, and delete sub-accounts as well as assign or modify permissions attached to users accounts operated by the organization. The central management administrtor 214, may communicate with the service provider 210 over a network connection 208, such as the internet, and establish access policies users have to resources provided by the service provider. The Provider account administrator 214 may be able to change, update, or create access policies. Along with the central management administrtor 214, users or specific users may be able to change, update, or create access policies. In various embodiments, the central management administrtor 214 may access a management console in order to facilitate the centralized management of one or more Inline Data Encryptor through the use of the management console. The central management administrtor 214 may be capable of updating access keys, user credentials or manage rekeying of the Inline Data Encryptors. The management console may be maintained by the service provider in order to facilitate the management of the Inline Data Encryptors and user accounts as described above.

Once a user has been granted access to a service provider resource, the user may then, through user device 202, access the resource and perform operations. In various embodiments, the user can backup or restore data store remotely with the service provider through the Inline Data Encryptor 206. For example, in various embodiments, the user may through the Inline Data Encryptor 206, encrypt data and cause the encrypted data to be stored persistently with the data storage service provider. The Inline Data Encryptor may be located in the data center 216 and operates as a proxy between the service provider and the user. When operating as a proxy between the service provider and the user the Inline Data Encryptor may require the user to provide the Inline Data Ecryptor with log in credentials for the service provider the user is attempting to access.

In various embodiments, the user may select one or more files to store remotely on one or more storage devices provided by the service provider. In some examples, the user may select files by highlighting or dragging a selection box over graphical representation of the files, such as in a Graphical User Interface (GUI). The user device may establish a networked connection with the Inline Data Encryptor 206, such as through Application Programming Interface (API) calls to the Inline Data Encryptor 206. The API calls maybe made by a web browser on the user device or similar program. In various embodiments, the user device may establish a network connection to the Inline Data Encryptor 206 and execute executable code received directly from the Inline Data Encryptor or download the software from the Inline Data Encryptor to the user device. Once the data is selected, the user may select an operation to be performed on the data. As an example, the user may select the operation by a right click of a pointing device and selecting from a drop down menu or dragging and dropping highlight items onto a mapped drive representing remote storage provided by the service provider. The user may also select files and operations through command line operation. In various embodiments the user may provide user credentials to the Inline Data Encryptor through the user interface on the user device. For example, in various embodiments, the user may be presented with a log in screen on the user device and using the keyboard or touch screen on the user device enter log in information, which may be transmitted to the Inline Data Encryptor.

Figure 3:
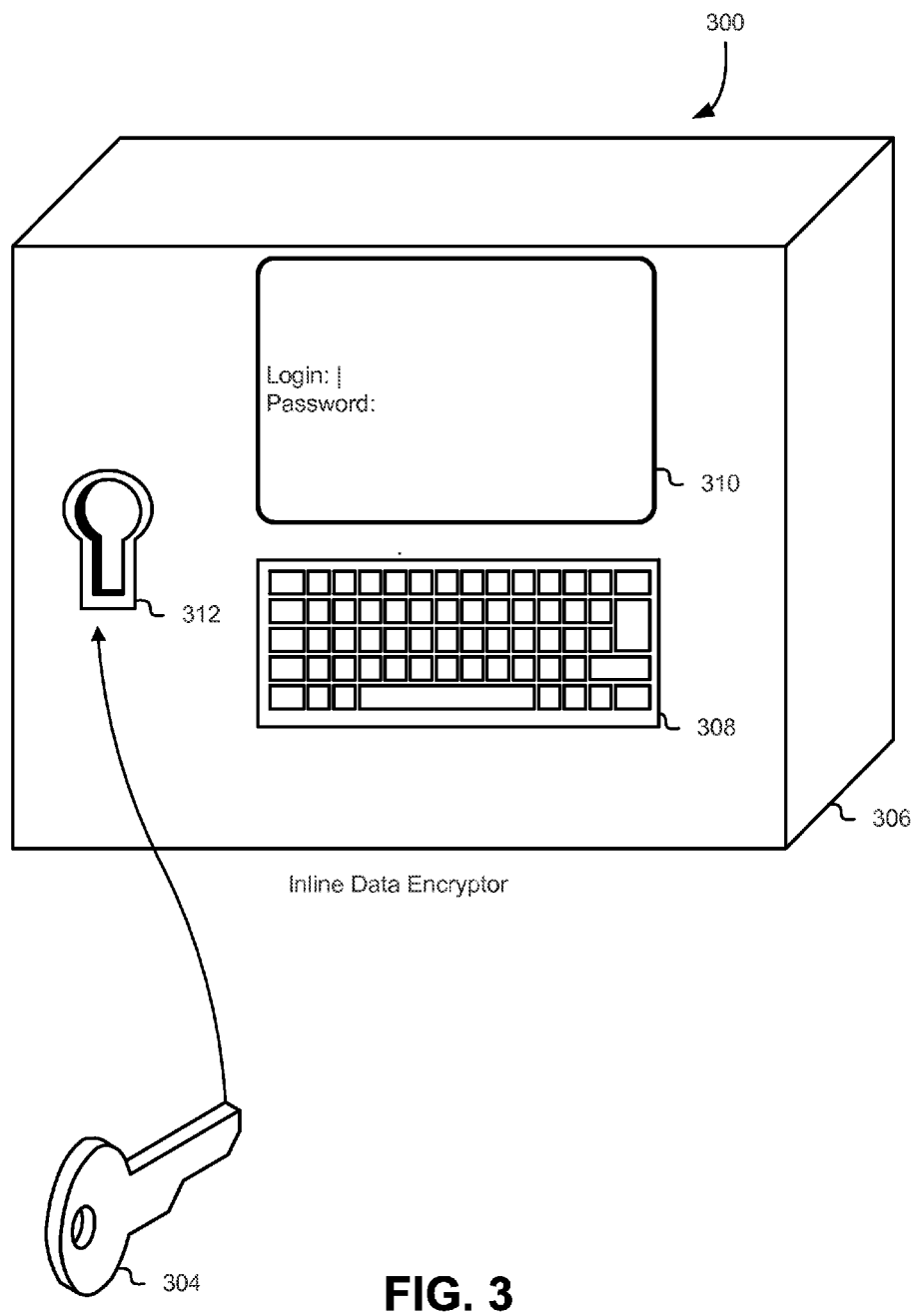
FIG. 3 shows an illustrative example of a device with which various embodiments can be practiced.

As discussed above, various embodiments of the present disclosure are directed to encrypting data to be store remotely. The encryption maybe provided by an Inline Data Encryptor as described above. FIG. 3 accordingly shows an illustrative example of an Inline Data Encryptor 300 in accordance with various embodiments. The Inline Data Encryptor may include a housing 306, the housing may be ruggedized for various application. In various embodiments, that the housing may be tamper evident including one or more sensors configured to detect tampering such that, if tampering of the Inline Data Encryptor is detected, the memory may be erased such as by cutting power to volatile memory and/or issuing a SecureErase command to an SSD. In these instances, the Inline Data Encryptor may include a battery, to maintain back up power in the event a tampering event includes cutting AC power to the Inline Data Encryptor. In various embodiments, the housing may be adapted for use in a server array or server rack as described later with reference to FIG. 10.

In various embodiments, the Inline Data Encryptor 300 may include a user interface such as a screen 310 and keys 308. The screen 310 may be an LCD or touch screen, and may be used to display information to the user or the operational status of the Inline Data Encryptor. The keyboard 308 may be a full QWERTY keyboard or some portion thereof. The Inline Data Encryptor may also include a key reader 312 used to detect the presence of a physical key. The key reader may include a small hole for inserting the physical key into a lock. While key readers are used throughout for the purpose of illustration, the scope of the present disclosure includes any devices, which may be referred to as fill device reader, from which cryptographic information can be obtained from a fill device. In various embodiments, the key reader not only detects the presence of the physical key but enables the transfer of information, such as a secret key or login credentials, between the physical key and the Inline Data Encryptor. By way of non-limiting example, the key reader can be a USB port for accepting a USB devices and transferring information from the physical key to the Inline Data Encryptor. In various embodiments, the key reader can be a contact or contactless smart card reader, a Radio-Frequency Identification device (RFID), a Near Field Communication device (NFC), a short-wavelength radio device, or similar device capable of transferring information.

In various embodiments the physical key 304 may be unique and tamper proof, in order to prevent duplication. In some embodiments, the key maybe duplicated and distributed to various geographical locations in order to facilitate the transmission of encrypted data and enable decryption of data at its terminus. The physical key 304 may be a common fill device (CFD) or other device capable of receiving keying material and loading the received keying material onto a cryptographic device. For example, the fill device may be a CIK or a computing device with a key management console connected over a network to one or more cryptographic devices, such as an Inline Data Ecryptor. In various embodiments, the physical key can be a key FOB, the FOB can be used by the Inline Data Encryptor to provide two factor authentication. The physical key 304 may also contain EEPROM memory for storing cryptographic information. In various embodiments the Inline Data Encryptor can, through the key reader 312, detect the presence of the physical key and obtain keying information from the memory of the physical key. For example, in some embodiments, the physical key may contain EEPROM memory and a short-wavelength radio device for communication the information store in the EEPROM memory. The Inline Data Encryptor can then use the keying information to encrypt data. The physical key maybe part of or made from a another device, such as a smart phone or tablet. The Inline Data Encryptor, in various embodiments, can further encrypt the data with information stored in the Inline Data Encryptor.

Figure 4:
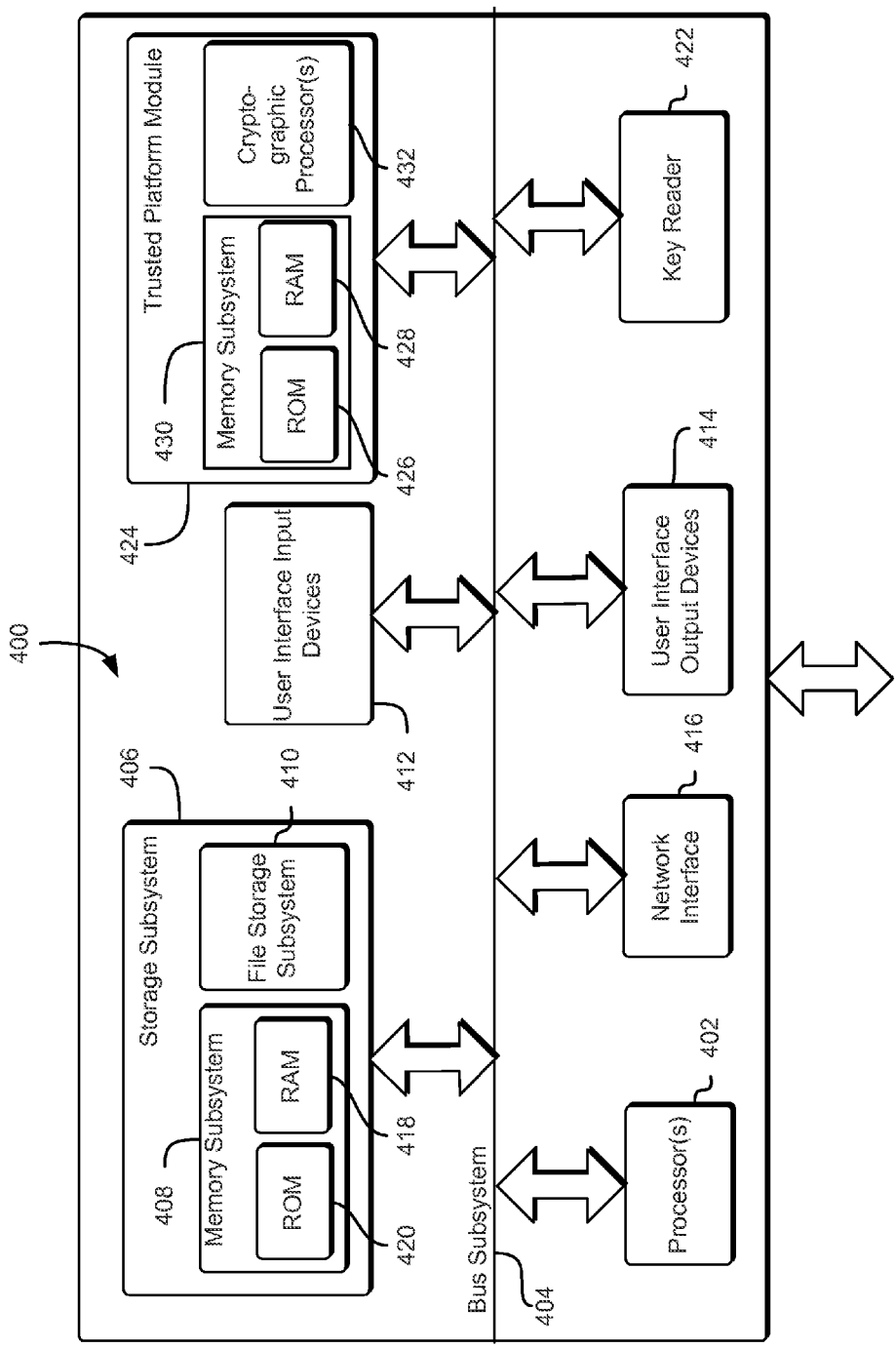
FIG. 4 shows an illustrative example of a device with which various embodiments can be practiced.

FIG. 4 is an illustrative, simplified block diagram of an example device system 400 that may be used to practice at least one embodiment of the present disclosure. In various embodiments, the device system 400 may be used to implement any of the systems illustrated herein and described above. For example, the device system 400 may be used to receive data from a user device that has been selected by a user to have some cryptographic operation done to the data. As shown in FIG. 4, the device 400 may include one or more processors 402 that may be configured to communicate with and are operatively coupled to a number of peripheral subsystems via a bus subsystem 404. These peripheral subsystems may include a storage subsystem 406, comprising a memory subsystem 408 and a file storage subsystem 410, one or more user interface input devices 412, one or more user interface output devices 414, a network interface subsystem 416, a key reader 422, a TPM 424, comprising a memory subsystem 430, and one or more cryptographic processors 432.

The bus subsystem 404 may provide a mechanism for enabling the various components and subsystems of device system 400 to communicate with each other as intended. Although the bus subsystem 404 is shown schematically as a single bus, alternative embodiments of the bus subsystem may utilize multiple busses.

The network interface subsystem 416 may provide an interface to other device systems and networks. The network interface subsystem 416 may serve as an interface for receiving data from and transmitting data to other systems from the device system 400. For example, the network interface subsystem 416 may enable an organization to connect the device to a sever array in a data center and operate as a proxy between users connected locally to the data center and the remote service provider. For example, as will be illustrated in FIG. 5, the user may utilize the device to transmit encrypted data to a remote service provider for secure storage over a network, such as the Internet. Additionally, the user may use the device to decrypt data stored remotely by the service provide and receive the data in plain text form. The network interface subsystem 416 may also facilitate the receipt and/or transmission of data on other networks, such as an organizations intranet.

The user interface input devices 512 may include one or more buttons as illustrated in FIG. 3, a keyboard, pointing devices such as an integrated mouse, trackball, touchpad, or graphics tablet, a scanner, a barcode scanner, a fingerprint scanner, a retinal scanner, a touch screen incorporated into the display, audio input devices such as voice recognition systems, microphones, and other types of input devices. In general, use of the term "input device" is intended to include all possible types of devices and mechanisms for inputting information to the device system 400.

User interface output devices 414 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the device system 400. The output device(s) 414 may be used, for example, to present user interfaces to facilitate user interaction with applications performing processes descried herein and variations therein, when such interaction may be appropriate.

The storage subsystem 406 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, may be stored in the storage subsystem 406. These application modules or instructions may be executed by the one or more processors 402. The storage subsystem 406 may additionally provide a repository for storing data used in accordance with the present disclosure. The storage subsystem 406 may comprise a memory subsystem 408 and a file/disk storage subsystem 410. The file/disk storage subsystem 410 may be used to store data selected by the user to have a cryptographic operation performed on it temporarily before being transmitted to the user or the service provider.

The memory subsystem 408 may include a number of memories including a main random access memory (RAM) 418 for storage of instructions and data during program execution and a read only memory (ROM) 420 in which fixed instructions may be stored. The file storage subsystem 410 may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

The key reader 422 may include one or more of readers, including a contact smart card reader, contactless smart card reader, key hole, USB port, SATA port, NCF port, RFID port, or short range radio receiver, and other types of readers or data transmission devices. The key reader may operate as a means for the device 400 to detect physical keys and obtain information from one or more physical keys. For example, in various embodiments, the key reader may accept the physical key by way of a small hole in a lock, the physical key may notches or grooves that, when inserted into a lock and turned, operates the lock's mechanism. This may enable the device 400 to obtain keying information from the physical key. The keying information may be store on memory housed inside the physical key. The key can have external contacts to enable the key reader to read the physical key's memory. In some embodiments, physical key may be capable of contactless communication with the key reader, such as contactless smart card technology. In either contact or contactless operation, the key reader can read keying information from the physical key and communicate the information to other parts of the device 400 through the bus system 404. In various embodiments, the key reader may function to detect physical objects for use with the Inline Data Encryptor.

The TPM 424 includes a memory subsystem 430, including a main random access memory (RAM) 428 for storage of instructions and data during program execution and a read only memory (ROM) 426 in which fixed cryptographic information may be stored, such as a root key or user private. The device 400 may also store keys in RAM 428 for temporary cryptographic processing. The cryptographic information stored in memory maybe use in combination with cryptographic information obtained from the physical key to encrypt information stored in the storage subsystem 406 or on a stream level as it come into the device 400 through the network interface 416. That data to be encrypted may also be stored in file storage subsystem until it is ready for cryptographic processing or some other triggering event. The one or more cryptographic processor may be used to accelerate cryptographic processing in the device and may include a random number generator, RSA key generator SHA-1 hash generator, and an encryption-decryption-signature engine. In various embodiments, the key reader 422 may obtain from the memory of the physical key user credentials for service provider. The user credentials maybe store temporarily in memory subsystem for use in authentication with the service provider and encryption of the data. An example of this process will be discussed below with reference to FIG. 5.

Figure 5:
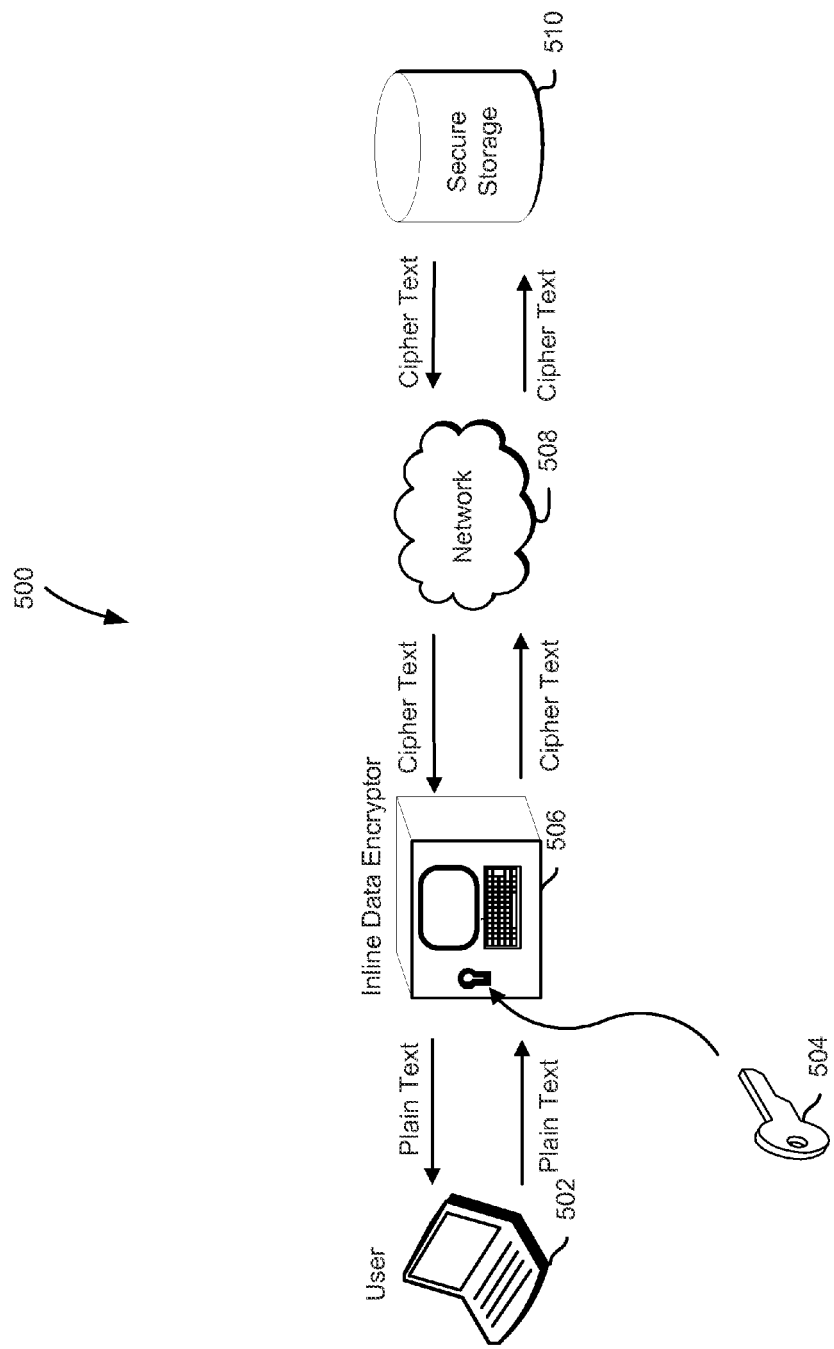
FIG. 5 shows an illustrative example of an environment in which various embodiments can be practiced.

FIG. 5 is an illustrative example of an environment 500 in which various embodiments can be practiced. In environment 500, the user may select information to be store remotely by the service provider through user device 502. Selection of information can be done through the user interface on the user device, such as a mouse or other pointing device. Selection of information can also be made using other input devices such as a keyboard or audio recognition device. The user then selects an operation to be performed on the selection of information. Operations include by way of non-limiting example, upload, download and compare. Once information and an operation is selected the user device may transmit plain text data to the Inline Data Encryptor 506 through a connection, as described above. In order to protect data between the user device 502 and the Inline Data Encryptor 506 various connections may be used, such as a direct connection, Virtual Private Network (VPN), Secure Socket Layer (SSL) connection or other form of protected session.

The Inline Data Encryptor receives the information and the operation to be performed from the user device. The Inline Data Encryptor 506 may check for a physical key 504 before accepting information over a connection. In some embodiments, the Inline Data Encryptor 506 can receive information and an operation to be performed over the connection before detecting a physical key 504. The Inline Data Encryptor 506 may then determine the presence of a physical key, and once detected, prepare to processes the information. The Inline Data Encryptor may then obtain secret information from the physical key 504 in order to process the information. The Inline Data Encryptor may obtain the information through a key reader as described above. The physical key 504 and the information it contains can also be built into the Inline Data Encryptor 506. The physical key 504 can also contain service provider specific secret information along with user or organization specific secret information. The Inline Data Encryptor 506 can obtain from the physical key 504 credential information and keying material for use when encrypting plain text data received from the user device 502. In various embodiments, the Inline Data Encryptor may first encrypt the plain text to create cipher text, with service provider secret information. The service provider secret information may be obtained from a variety of locations: the physical key, the user through a user interface, the Inline Data Encryptor itself, or directly from the service provider over a network connection. Once encrypted with the service provider secret information the Inline Data Encryptor can further encrypt the cipher text with secret information obtained from the physical key unknown to the service provider. This extra layer of encryption may prevent the service provider from having access to the contents information encrypted.

After the Inline Data Encryptor 506 has encrypted the plain text and create cipher text using keying information; it may safely be transmitted over a network 508, such as the Internet. The cipher text is received by the service provider and stored in secure storage 510. The service provided may also receive a request from the user for encrypted data stored in secure storage 510. In various embodiments, the user through the user interface on the user device 502 may request encrypted information stored by the service provider. The request can be sent directly to the service provider over a network 508 or can be routed through the Inline Data Encryptor 506 to facilitate decrypting by the Inline Data Encryptor. The Inline Data Encryptor may upon receiving the request attempt to detect both the connection and the physical key 504. The service provider may respond to the request, which may include user credentials for authorization by the service provider, by sending cipher text over the network 508, to the Inline Data Encryptor 506.

The Inline Data Encryptor 506 may then receive the cipher text over a network connection. As described above, the Inline Data Encryptor may obtain credential and keying information from the physical key 504. This information may then be used to decrypt the cipher text and create plain text to be transmitted to the user through the user device 502. Depending on the type of encryption used, in various embodiments, the cipher text may be first decrypted using the secret information obtained from the physical key and then further decrypted using the user secret information associated with the user credential for the service provider. Decrypting the cipher text creates plain text which may then be transmitted to the user device over a connection.

Figure 10:
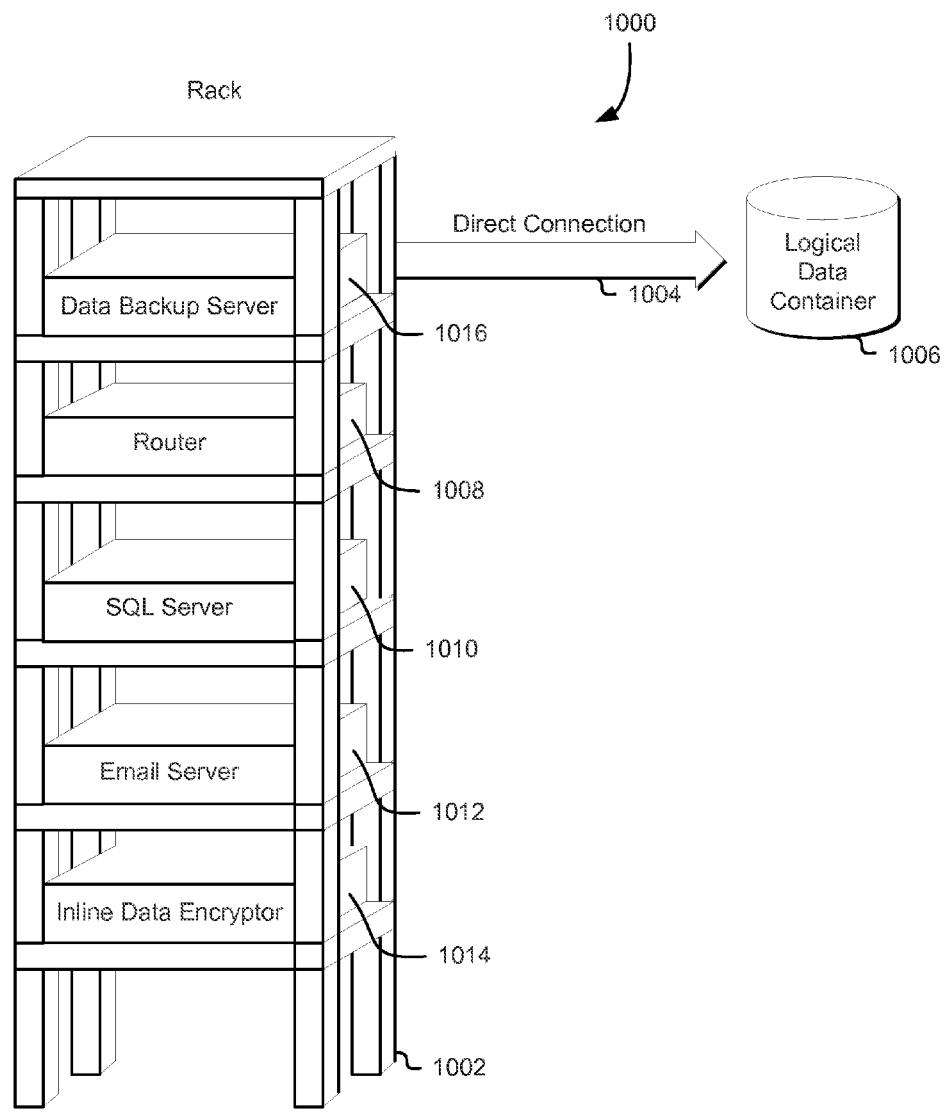
FIG. 10 shows an illustrative example of an environment in which various embodiments can be practiced.

In various embodiments, encrypted data can be sent or retrieved from various geographic locations. Example embodiments will be described in relation to FIG. 6, which is an illustrative example of an environment 600 in which various embodiments can be practiced. In environment 600, the user can securely transmit sensitive or confidential information from one location to another through the use of the Inline Data Encryptor and the physical key. In various embodiments, facility 1 and facility 2 may be different work sites operated by the organization or may be two sites operated by different organizations. The facilities may be mobile sites connected to the network 608 over a wireless connection or may be traditional installations connected to the network 608 over a direct wired connection. Furthermore the facilities may include a data center with server array as depicted in FIG. 10, to be described in detail below. User 1 located at facility 1 selects information, using the user device 602, the Inline Data Encryptor 606 receives the information, encrypts the information as described above, and transmits the encrypted information to the desired location. For example, in various embodiments, the Inline Data Encryptor my transmit the encrypted data to remote storage provided by the service provider or directly to another Inline Data Encryptor 612 located at facility 2. User 2 or User 1 may operate the user device at facility 2 in order to select information to be retrieved and decrypted through the Inline Data Encryptor 612 at Facility 2.

In various embodiments, user 1 at facility 1 establishes a connection with Inline Data Encryptor 606, the connection may be a physical connection or networked connection as described above. The user may then select information to be secured and an operation to be performed, such as uploading the information to secure storage of the service provider. The information and selected operation are transmitted to the Inline Data Encryptor 606, the Inline Data Encryptor checks for the presences a connection with the user device and a physical key, as described above. The Inline Data Encryptor may be located in the data center of facility 1 and operate as a proxy between facility 1 and the information's destination. Once both the physical key 604 and the connection are detected the Inline Data Encryptor 606 may encrypt the information received from the user device. The encryption may be done using keying material obtained from the physical key, as described above. The encrypted information may then be sent directly to facility 2 or to the service provider for remote storage depending on the operation selected by the user. In various embodiments, where the information is sent directly to the Inline Data Encryptor 612 at facility 2, the Inline Data Encryptor 612 may have built in storage to facilitate retrieval of the information at facility 2.

In various embodiments, at facility 2 a second user, user 2, may select information from the secure storage 610 of the service provider to be downloaded and decrypted by the Inline Data Encryptor 612. This information may be the same as the information encrypted by user 1 above or may be other information. In various embodiments the Inline Data Encryptor may receive the selection from user 2, detect both a connection and a physical key, and transmit the selection to the service provider to process the request. The request maybe signed using credential information retrieved from the physical key, as described above, or the Inline Data Encryptor may request credential information from user 2 directly. When the Inline Data Encryptor 612 receives from the service provider the information selected by the user it may again check for a connection and a physical key before decrypting the information and transmitting it to the user device.

The physical key 604 could be the same key used to encrypt the information at facility 1, may be a copy of the physical key used at facility 1, or may be a partial copy of the physical key used at facility 1. In various embodiments, the physical key could have a copy of the keying material used at facility 1 but different credential (e.g., credentials for user 2 as opposed to user 1). In various embodiments, different credentials may correspond to different access level or permissions. The credentials may be generated by the organization as described in FIG. 2 or may be provided by the service provider. The credentials may determine read/write access as well as administrator privileges. The physical key may be transported from facility 1 to facility 2 and may be inserted directly in to the Inline Data Encryptor 612 or be within a specific proximity to the Inline Data Encryptor 612. The physical key may also contain multiple credential sets, which may be selectively obtained by the Inline Data Encryptor.

In various embodiments, the Inline Data Encryptor 612 may be transported, along with the physical key or separate from the physical key, from facility 1 to facility 2. The Inline Data Encryptor may also be located inside the network 608 and operated as a proxy, the user may connect directly to the Inline Data Encryptor or the process may be automated on the user device. The Inline Data Encryptor 612 at facility 2, may detect a connection to user device 614 and a physical key. User device 614 may be the same as user device 602 at facility 1 or it may be a different device. As described above the physical key 604 may be the same as the key used at facility 1 or a different key. The Inline Data Encryptor 612 may obtain information based on user selection for download from the service provider. Once obtained the Inline Data Encryptor 612 may then submit a signed download request to the service provider 610. The service provider may then authenticate the request and transmit the selected information to the Inline Data Encryptor 612. The Inline Data Encryptor 612 may receive the information and decrypt the information using one or more keys depending of the encryption method used, as described above. The decrypted information may then be transmitted in plain text from the Inline Data Encryptor to the user device at facility 2.

Figure 6:
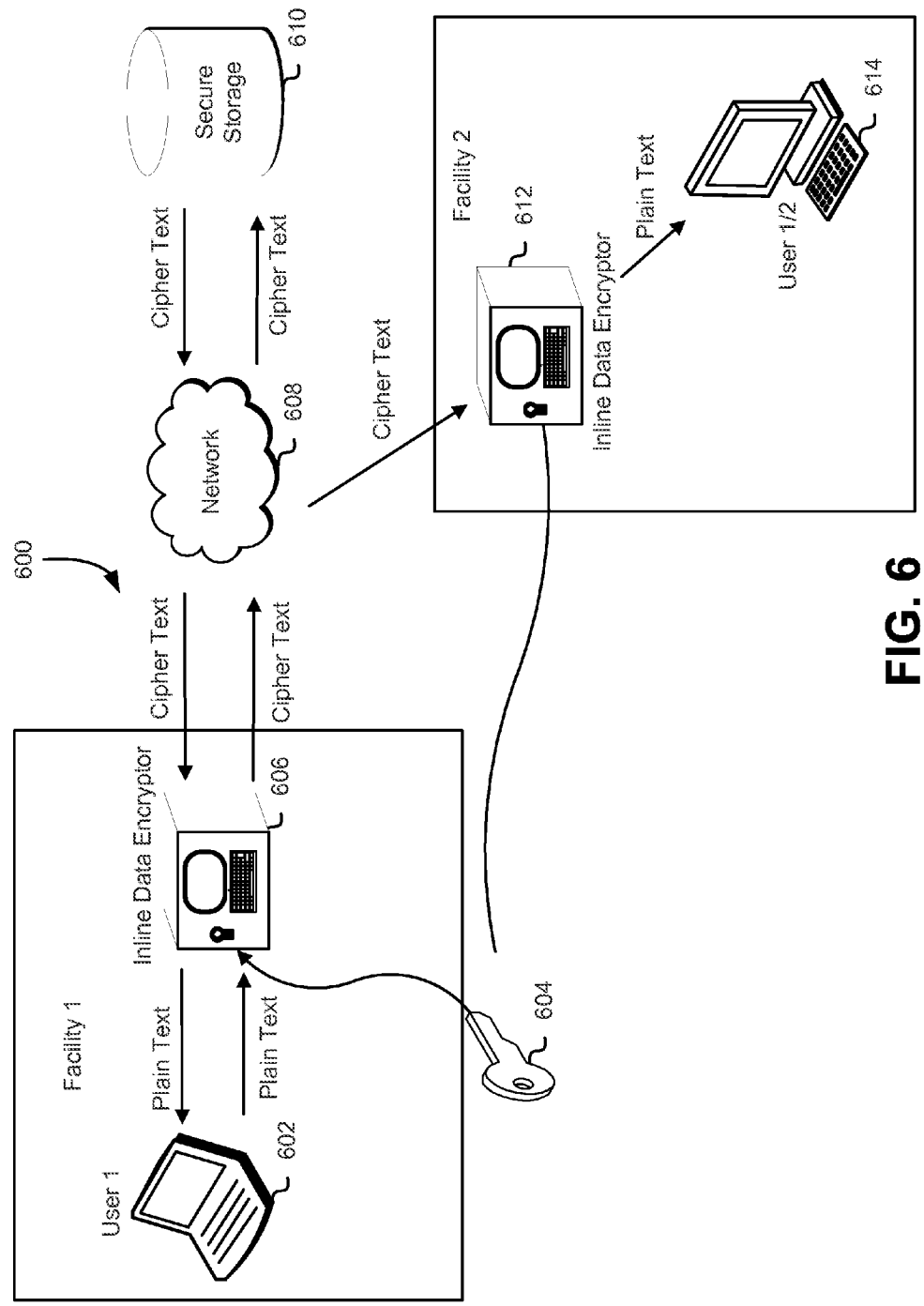
FIG. 6 shows an illustrative example of an environment in which various embodiments can be practiced.
Figure 7:
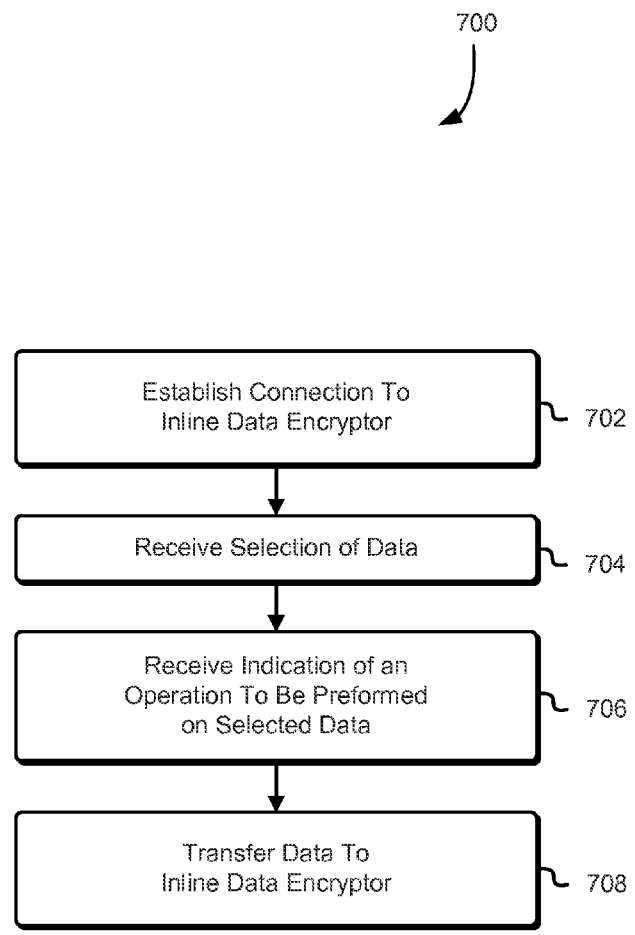
FIG. 7 shows an illustrative example of a process for encrypting data using a device in accordance with at least one embodiment.

FIG. 7 shows an illustrative example of a process 700 which may be used to secure data. The process 700 may be performed by any suitable system, such as by the user device described above in connection with FIG. 2 and/or an appropriate component thereof, such as by a web browser operating to provide the connection and interface with the user. Returning to FIG. 7, in an embodiment the process 700 includes establishing 702 a connection to the Inline Data Encryptor. The connection maybe established in any suitable manner. For example, referring to FIG. 2 a web browser on the user device may establish a network connection, such as an HTTPS session, with the Inline Data Encryptor. As illustrated by FIG. 7, once a connection is established 702 the user device may receive a selection of data 704. Referring to FIG. 2 for example, the user may drag a cursor and highlight selected files through a GUI interface. Along with receiving a selection of data 704 the user device receives an operation to be performed on the data. Referring to FIG. 6, the data may be transferred to a service provider for storage and retrieval at a later date. The indication of an operation 706 may be received in a similar manner as the selection of data. For example, referring to FIG. 2 the use may drag and drop files in a GUI from a local drive to a network drive. Again referring to FIG. 2, the user may right click on selected files and indicate a desired operation from a drop down menu. In various embodiments the selection of data 704 and indication of an operation to be performed 706 may be made through a command line or similar interface. Once the user device has received indication of a desired operation 706 the user device then transfers 708 the data and operation information to the Inline Data Encryptor for processing.

All or part of the process described above in relation to FIG. 7 may be automated so as not to require user input. For example, referring to FIG. 6 the customer may desire all information generate at facility 1 to be automatically store with the service provider 610. The process 700 may establish a connection 702 and automatically select 704 all data stored on the user device and indicate the select data is to be saved remotely by the service provide, at which point it may be transfer 708 to the Inline Data Encryptor for encryption as described above. The data in the above example may be continuously stream from the user device to the Inline Data Ecryptor, scheduled to occur at regular intervals, occur upon a triggering event, or similar process.

Numerous variations of the process 700 may be performed. For example, the user may physically connect the Inline Data Encryptor to the user device through a SATA or similar connection to initiate the encryption or decryption process. The process may be partially or completely automated depending on the application. For example, the process may be used in connection with an automated device, such as a security camera or drone. The process may also be set to be performed periodically, to facilitate the back up or update if secret information. The user may also select information and indicate an operation before establishing a connection to the Inline Data Encryptor. The process may also prepackage data from transfer to the Inline Data Encryptor before a connection is established.

Figure 8:
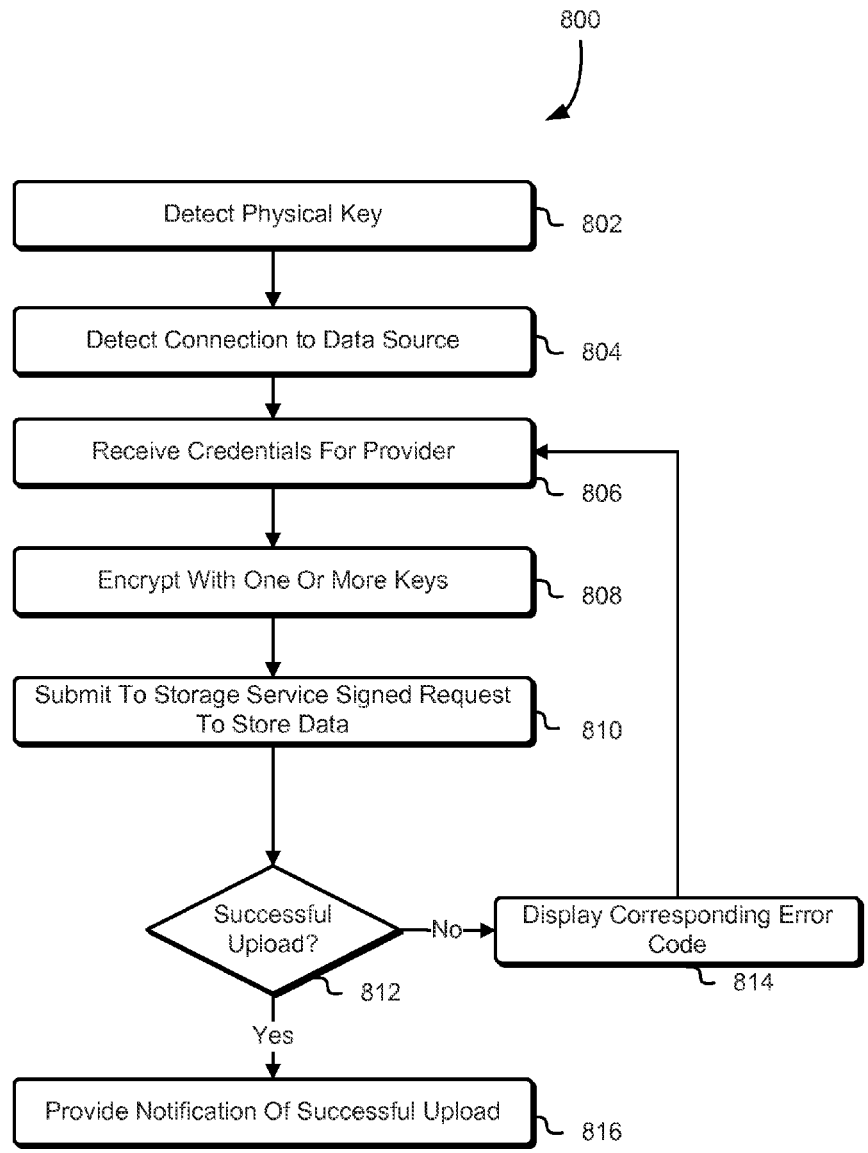
FIG. 8 shows an illustrative example of a process for encrypting and storing data using a device in accordance with at least one embodiment.

FIG. 8 shows an illustrative example of a process 800 for encrypting data. The process 800 encrypts data and preforms an operation received from the user device as illustrated by the process in FIG. 7. The process may be performed by any suitable cryptographic device, such as the device described above in relation to FIG. 4. In an embodiment the process 800 detects 802 the presences of a physical key and may also detect 804 the presences of a connection to a data source. In various embodiments, the Inline Data Encryptor may run in a loop detecting the presence of either the physical key and/or a connection to a data source. In various embodiments the Inline Data Encryptor itself may be the data source. For example, referring to FIG. 6 the Inline Data Encryptor 606 may transfer encrypted information directly to Inline Data Encryptor 612, which may be store directly on the Inline Data Encryptor for retrieval by user at facility 2. The connection 804, may be a physical or networked connection as described above.

Returning to FIG. 8, once the Inline Data Encryptor has detected both a physical key and a connection to the data source, the Inline Data Encryptor receives 806 credentials for the service provider. The credentials may be obtained from the physical key, as described above. In various embodiments, the credentials may be received from the user device. For example, referring to FIG. 2 the web browser running on the user device may prompt the user for login credentials, which are then received by the Inline Data Encryptor. Once the credentials are received the Inline Data Encryptor may then encrypt 808 the data with one or more keys. The data to be encrypted may be the data transferred 708, referring to FIG. 7, from the user device as described above. The Inline Data Encryptor may then submit 810 a request to the service provider to store the encrypted data. In various embodiments the request is signed with the user private key provided in the user credentials (or another private key shared between the user and the provider) and transmitted to the service provider for authentication and storage. In various embodiments a request may be submitted before or contemporaneously with the encryption process. For example, referring to FIG. 5 the Inline Data Encryptor may submit a request to store data with the service provider and once authenticate stream encrypted data to the service provider using a stream cipher operation.

In various embodiments, once a signed request is submitted the Inline Data Encryptor determines whether the encrypted data has been successfully uploaded 812. If the data has not been successfully uploaded the corresponding error code 814 is displayed to the user. For example, if the service provider fails to authenticate the signature submitted with the request Inline Data Encryptor may prompt the user to re-enter credentials 806 for use with the service provider. In various embodiments, when an error occurs the user may be asked to provide additional input. For example, when the network connection between the Inline Data Encryptor and the service provider times out or is interrupted the user maybe asked if the Inline Data Encryptor is to attempt to resubmit the encrypted data.

If the Inline Data Encryptor determines the encrypted data has been uploaded successfully the user is notified of successful transmission. For example, with reference to FIG. 6 if the Inline Data Encryptor successfully uploads the encrypted data to the remote service provider secure storage 610 a notification may be sent to the user device. The notification may be any suitable means of notifying the user, such as a dialog box, status bar, an audible tone or combination.

Numerous variations of the process 800 may be performed. The process may commence upon receipt of data from the user device. The key reader may be connected to the power supply of the device in such a way that the device is unpowered until the physical key is inserted it the Inline Data Encryptor and process 800 commences. The Inline Data Encryptor may determine if the user credentials are authorized before encrypting the data. This may avoid unnecessary computations and energy consumption. The process may be modified so that while the physical key is present all data transferred is encrypted and streamed to the service provider.

Figure 9:
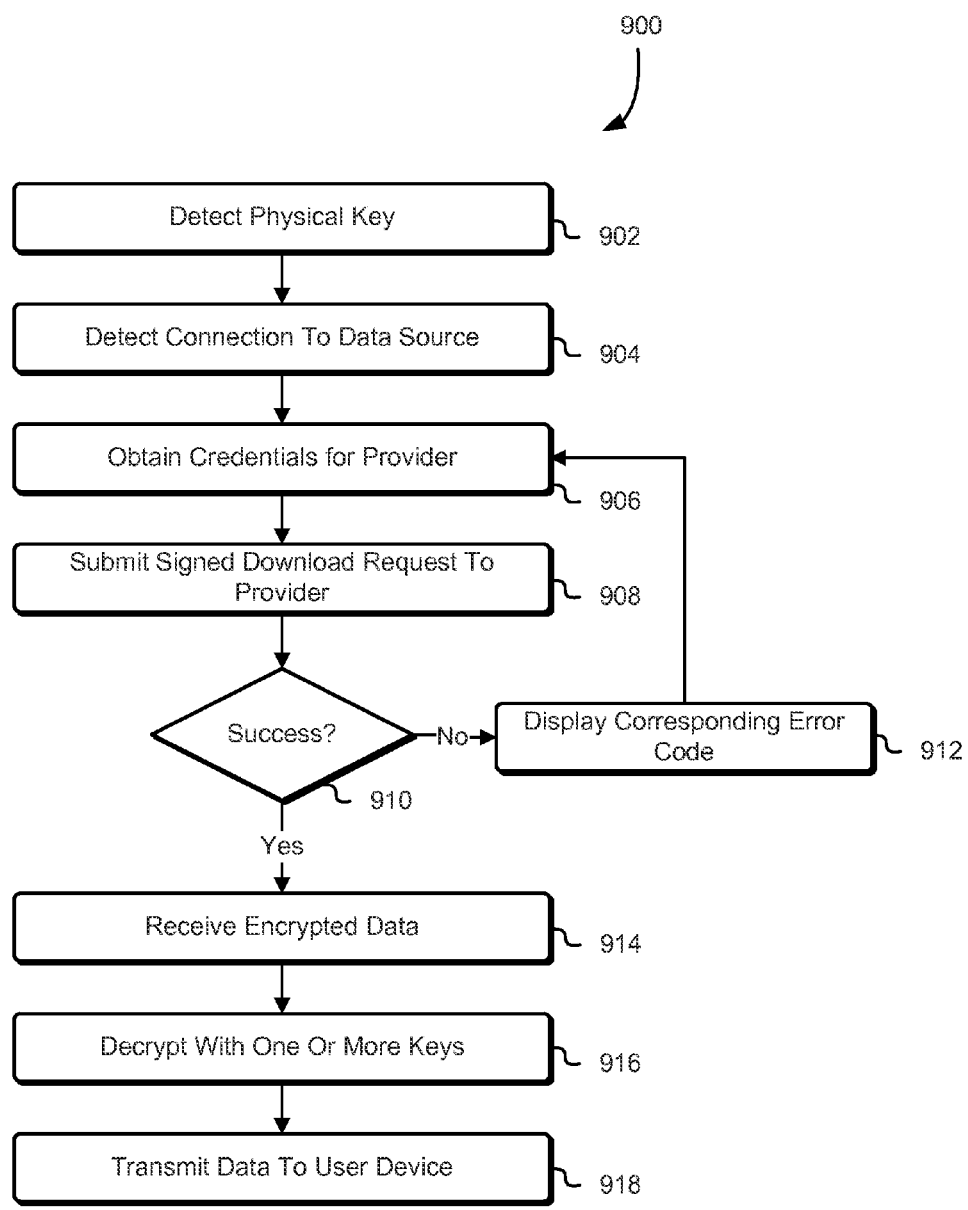
FIG. 9 shows an illustrative example of a process for decrypting and retrieving data using a device in accordance with at least one embodiment.

FIG. 9 shows an illustrative example of a process 900 for decrypting data. The process 900 decrypts data and preforms an operation received from the user device as illustrated by the process in FIG. 7. The process may be performed by any suitable cryptographic device, such as the device described above in relation to FIG. 4. In an embodiment the process 900 detects 902 the presences of a physical key and a connection 904 to a data source. As described above the physical key is detected by a key reader and maybe physically inserted into the Inline Data Encryptor. The connection to a data source may be a direct wired connection, such as a fiber optic cable, or a wireless connection. In various embodiments the direct connection may also be a SATA connection, as described above. The Inline Data Encryptor then obtains 906 user credentials to submit 908 to the service provider for authentication. Referring to FIG. 6, the credentials may be obtained from the physical key 604 and may be the same credentials used by the Inline Data Encryptor 602 to store the data remotely with the service provider 610. In various embodiments, an organization may have multiple accounts with the service provider and each account may be assigned different credentials. Again with reference to FIG. 6, the Inline Data Encryptor 602 may submit a signed request to store data with the service provider, the request being signed with a set of user credentials obtained from physical key 604. Inline Data Encryptor 612 may receive from user device 614 a request to retrieved information stored by the service provider. This request may be signed by the Inline Data Encryptor using another set of user credentials obtained through a prompt to the user on user device 614.

In various embodiments the Inline Data Encryptor determines if the service provider has authenticated 910 the signed request, e.g., by providing a response to the request that initiates the requested download. If the service provider does not authenticate the request an error message 912 may be displayed to the user through the user device, as described above. If the Inline Data Encryptor determines the service provider has authenticated the request the process continues and the Inline Data Encryptor receives the encrypted 914 data. The Inline Data Encryptor may receive the data over a network, such as the network 608 in FIG. 6. In various embodiments the data may already be located on a file storage system on the Inline Data Encryptor. Once Inline Data Encryptor has received the data it may be decrypted 916 using one or more keys. The Inline Data Encryptor may wait until all the data requested is received before decrypting the data or may decrypt the data as it is received. Decrypted data may be transmitted 918 by the Inline Data Encryptor to the user device in plain text as requested by the user. Transmission by the Inline Data Encryptor may occur as the information is being decrypted or the Inline Data Encryptor may wait until all the received information has been decrypted.

FIG. 10 is an illustrative example of an environment 1000 with which various embodiments can be practiced. Environment 1000, may contain a server array 1002 which includes devices typically found in a data center or other facility of a customer of the service provider. The devices may include a router 1008, an SQL server 1010, an e-mail server 1012 or other device suitable for use in a data center. The server array 1002 may also have a direct fiber optic connection 1004 to a service provider logical data container 1006, e.g., a logical data container maintained by the service provider for storage of data by the customer. The server array at the data center may also include an Inline Data Encryptor 1014, to facilitate data protection. For example, with reference to FIG. 6 facility 1 and 2 may contain a server array as illustrated in FIG. 10 include the Inline Data Encryptor 1014. The Inline Data Encryptor 1014 may operate as a proxy between the user devices 602 and 614 and the network 608. The user may connect directly to the Inline Data Encryptor 1014 located in the data center over a local area network connection. The user may, as described above select data to be stored remotely by the service provider. Once received by the Inline Data Encryptor the data maybe encrypted and sent over direct connection 1004 to the service provider logical data container 1006. Further, in some embodiments, the Inline Data Encryptor includes a connection to a data backup server 1016 to back up the email and SQL servers. The Inline Data Encryptor may transmit backup data from the data backup server 1016 utilizing the techniques described above.

Figure 11:
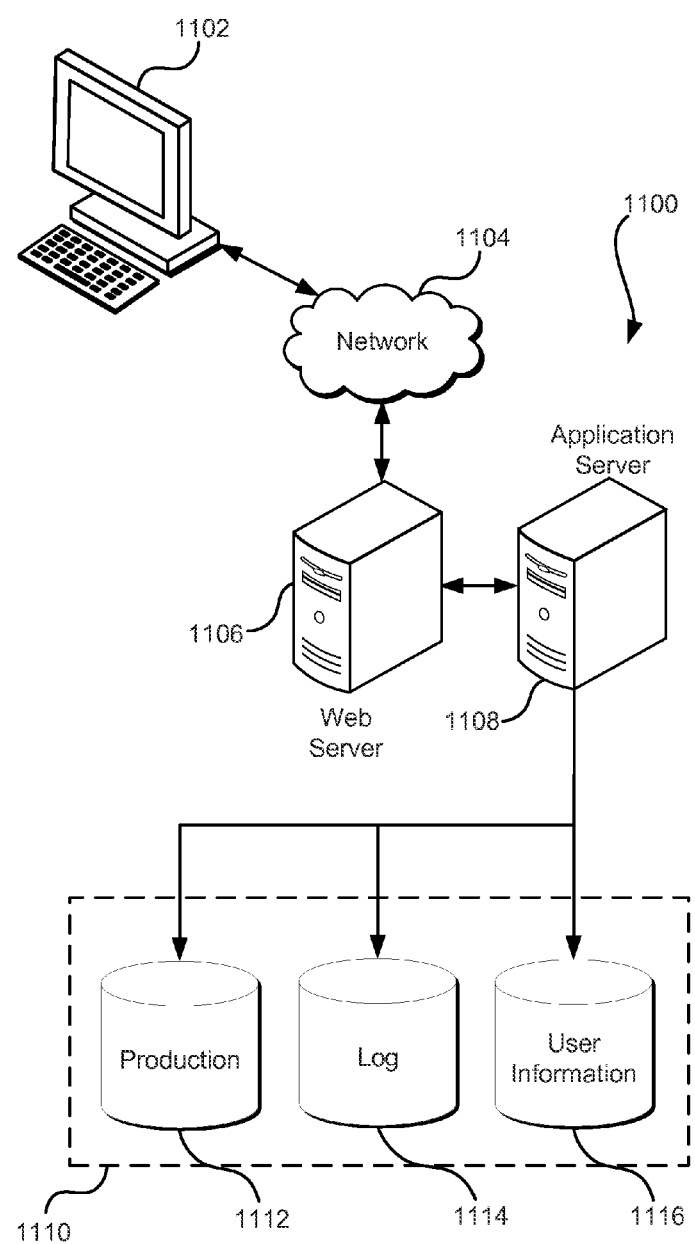
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and receive requests, messages or information over an appropriate network 104 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1110 can include several separate data tables, databases or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user, through a device operated by the user, might submit a search request for a certain type of item. In this case, the data store might access the user information to verify the Identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
a fill device reader configured to receive a fill device and obtain information stored on the fill device;
a device interface for communicating with one or more user devices;
one or more processors; and
memory storing executable instructions that causes the one or more processors of the cryptographic device to collectively:
obtain cryptographic information from the fill device through the fill device reader;
use the obtained cryptographic information to encrypt data received from another device received through the device interface;
obtain credentials for accessing a data storage service operated by a service provider including a user private key stored on the fill device;
generate a signature using the user private key; and
use the obtained credentials to transmit, to a computer system of the data storage service over a service provider network operated by the service provider, the encrypted data and the signature to the data storage service of the service provider, validation of the signature indicating authorization for at least one operation performed by the data storage service.

2. The system of claim 1, wherein:
the cryptographic device receives a request from a user on a device through the device interface to perform an operation on the data;
performance of the operation involves at least one cryptographic process; and
the device establishes a connection between the device and the cryptographic device.

3. The system of claim 1, wherein:
the user establishes a physical connection between the cryptographic device and the user device through the device interface;
the user inputs credentials in to the cryptographic device through a user interface on the cryptographic device; and
the physical connection is used to transmit data to the cryptographic device.

4. The system of claim 1, wherein the encrypted data is encrypted using a stream cipher operation.

5. The system of claim 1, wherein the cryptographic information obtain from the fill device through fill device reader is unknown to the service provider.

6. A cryptographic device comprising:
an object detector for detecting a presence of a physical object;
an interface for communicating with one or more devices; and
memory storing executable instructions that causes one or more processors of the cryptographic device to collectively or individually:
retrieve cryptographic information from the object;
uses the retrieved cryptographic information to encrypt data received through the interface from a device;
obtain credentials, where demonstration of access to the credentials authorizes operations to be performed by a service provider, the credentials including a private key;
generate an electronic signature based at least in part on the private key; and
transmit the encrypted data and information demonstrating access to the credentials to the service provider thereby causing the service provider to persistently store the encrypted data based at least in part on the credentials, where the information demonstrating access to the credentials includes the electronic signature.

7. The system of claim 6, wherein the cryptographic information use to encrypted the data received through the interface from the device is stored on memory of the cryptographic device.

8. The system of claim 6, wherein the cryptographic device operates as a proxy between the device and the service provider.

9. The system of claim 6, wherein the credentials are inputted by a user into the device and obtained by the cryptographic device through the interface.

10. The system of claim 6, wherein the interface for communicating with one or more devices is a serial attachment (SATA), fiber channel (FC-AL), internet small computer system interface (iSCSI), peripheral component interconnect (PCI) or peripheral component interconnect express (PCIE).

11. The system of claim 6, wherein the interface for communicating with one or more devices is a virtual private network (VPN).

12. A computer-implemented method for encrypting data, comprising: under the control of a cryptographic device configured with executable instructions,
  detecting through a key reader a presence of a physical key;
  retrieving cryptographic information from the physical key;
  obtaining credentials for authentication with a service provided by a service provider, the credentials including a private key;
  obtaining through a device interface of the cryptographic device and from a data source external to the cryptographic device, data to be encrypted;
  generating, by cryptographic device, a digital signature using the private key;
  encrypting the data obtained through the device interface with the retrieved cryptographic information to generate encrypted data; and
  transmitting a request to perform the service to the service provider, the request including the encrypted data and information indicating access to the credentials, the request being authenticated, by one or more computer systems of the service provider, based at least in part on the credentials, the information indicating access to the credentials including the digital signature.

13. The method of claim 12, wherein:
  the request to perform the service by the service causes the service provider to persistently store the encrypted data; and
  the service provider lacks access to the cryptographic information used to encrypt the data causes to be persistently store.

14. The computer-implemented method of claim 12, wherein:
  the cryptographic information is obtained by the cryptographic device from the physical key through the key reader; and
  encrypting the data is done by operation of a stream cipher.

15. The computer-implemented method of claim 12, wherein detecting through the key reader of the cryptographic device the physical key further comprises inserting the physical key directly into the key reader.

16. The computer-implemented method of claim 12, wherein the obtained credentials are used to encrypted the data.

17. A non-transitory computer-readable storage medium having stored thereon instructions that, when executed by one or more processors of a computer system, cause the computer system to:
  detect a physical object; and
  as a result of detecting the physical object, enabling the computer system to transfer information to an external data storage service operated by a service provider by at least:
    using cryptographic information received from the physical object to encrypt data received through a device interface of the computer system; and
    using credentials for accessing the service provider to transmit, to the external data storage service, an authentic request to store the encrypted data, the authentic request authenticated, by one or more computer systems associated with the external data storage service, based at least in part on the credentials, where the credentials include a user private key obtained from the physical object and the authentic request including a digital signature generated based at least in part on the user private key.

18. The non-transitory computer-readable storage medium of claim 17, wherein the computer system transfers the encrypted data to the service provider over a direct connection to the service provider.

19. The non-transitory computer-readable storage medium of claim 17, wherein the encrypted data is encrypted using a stream cipher operation.

20. The non-transitory computer-readable storage medium of claim 17, wherein the computer system:
  transmits the credentials to the service provider; and
  receives authentication information from the service provider before encrypting data.

21. The non-transitory computer-readable storage medium of claim 17, wherein the device interface is a serial attachment (SATA), fiber channel (FC-AL), internet small computer system interface (iSCSI), peripheral component interconnect (PCI) or peripheral component interconnect express (PCIE).

22. The system of claim 1, wherein the user private key is a symmetric key.

23. The computer-implemented method of claim 12, wherein the request is transmitted over a virtual private network (VPN).

24. The non-transitory computer-readable storage medium of claim 17, wherein the credentials are further used for encrypting the authentic request.

* * * * *